United States Patent
Hoyt (10) Patent No.: US 11,882,937 B2
(45) Date of Patent: Jan. 30, 2024

(54) FLOOR TO CEILING OBJECT SUPPORT ASSEMBLY

(71) Applicant: Wayne Robert Hoyt, New Ipswich, NH (US)

(72) Inventor: Wayne Robert Hoyt, New Ipswich, NH (US)

(*) Notice: Subject to any disclaimer, the term of this patent is extended or adjusted under 35 U.S.C. 154(b) by 0 days.

(21) Appl. No.: 17/651,967

(22) Filed: Feb. 22, 2022

(65) Prior Publication Data

US 2022/0304468 A1 Sep. 29, 2022

Related U.S. Application Data (60) Provisional application No. 63/200,765, filed on Mar. 26, 2021.

(51) Int. Cl.
  *F16M 13/02* (2006.01)
  *A47B 96/14* (2006.01)
  *F16M 11/28* (2006.01)
  *A47B 81/06* (2006.01)

(52) U.S. Cl.
  CPC ............ *A47B 96/14* (2013.01); *A47B 81/064* (2013.01); *F16M 11/28* (2013.01); *F16M 13/02* (2013.01)

(58) Field of Classification Search
  CPC ..... A47B 96/14; A47B 81/064; A47B 57/565; A47B 96/1425; F16M 11/28; F16M 13/02; F16M 7/00; F16M 11/041
  See application file for complete search history.

(56) References Cited

U.S. PATENT DOCUMENTS

| | | | |
|---|---|---|---|
| 3,327,310 A | 6/1967 | Bethune et al. | |
| 3,592,434 A | 7/1971 | Murray | |
| 3,608,991 A | 9/1971 | Wade | |
| 5,083,729 A * | 1/1992 | Saeks | A47B 96/1425 248/200.1 |
| 5,381,738 A * | 1/1995 | Meyer | A47B 5/00 108/42 |
| 7,108,235 B2 | 9/2006 | Kanashiki | |
| 8,226,056 B2 | 7/2012 | Kallman | |
| 9,311,836 B1 | 4/2016 | van der Walde | |
| 9,664,334 B2 | 5/2017 | Baker et al. | |
| 10,619,789 B1 | 4/2020 | Copeland | |
| 10,827,644 B2 | 11/2020 | Diaz | |
| 2004/0217239 A1* | 11/2004 | Chuang | F16M 11/28 248/125.8 |
| 2008/0030939 A1 | 2/2008 | Gillespie et al. | |
| 2009/0073326 A1 | 3/2009 | Jang | |
| 2011/0043978 A1 | 2/2011 | Bremmon et al. | |
| 2014/0233205 A1 | 8/2014 | Gardes | |
| 2015/0048224 A1 | 2/2015 | Patterson | |

(Continued)

*Primary Examiner* — Terrell L McKinnon
*Assistant Examiner* — Jerry Olivier
(74) *Attorney, Agent, or Firm* — Dunlap Bennett & Ludwig, PLLC (57) ABSTRACT

In one aspect of the present invention, a plurality of floor to ceiling units are provided, with each unit supporting a portion of an article/object to be supported, such as a television or shelving. Each floor to ceiling unit may include a lower leg assembly and an upper leg assembly that are telescopically connected to one another. In use, they extend from a floor to a ceiling, and are provided with mounting assemblies for engaging the floor and ceiling. Arm assemblies provide the direct support for the article to be supported.

6 Claims, 6 Drawing Sheets

(56) References Cited

U.S. PATENT DOCUMENTS

| | | | |
|---|---|---|---|
| 2015/0327936 A1* | 11/2015 | Coleman | A47B 81/00 211/85.13 |
| 2019/0063665 A1 | 2/2019 | LeCote | |
| 2020/0121078 A1* | 4/2020 | Woo | F16B 2/10 |

* cited by examiner

FLOOR TO CEILING OBJECT SUPPORT ASSEMBLY

CROSS-REFERENCE TO RELATED APPLICATION

This application claims the benefit of priority of U.S. provisional application No. 63/200,765, filed Mar. 26, 2021, the contents of which are herein incorporated by reference.

BACKGROUND OF THE INVENTION

The present invention relates to television and/or shelving support and, more particularly, to a wall-less floor to ceiling mount therefor.

When setting up wall mounts for a television or a shelving unit, it is often hard to find studs. Then when it comes time to take down the television or shelving, holes are left in the wall that needs to be patched.

With other wall mounts, individuals must use a drill, stud finder, screwdriver, and other tools. Landlords do not like when holes are put in the walls. The holes leave a powdery mess on the floor and wall mounting to support heavy structures can only be made where the studs are located.

As can be seen, there is a need for a wall-less floor to ceiling mount for televisions and shelving units.

SUMMARY OF THE INVENTION

In one aspect of the present invention, a plurality of floor to ceiling units are provided, with each unit supporting a portion of an article/object to be supported, such as a television or shelving. Each floor to ceiling unit may include a lower leg assembly and an upper leg assembly that are telescopically connected to one another. In use, they extend from a floor to a ceiling, and are provided with mounting assemblies, which may include plates (for example, 3- to 4-inch plates), nuts, threaded rods, and coupling nuts, for precise height adjustments.

Arm assemblies provide the direct support for the article to be supported. Each arm assembly may include: a sleeve including pipes for coupling the rest of the holding arm assembly to the leg assemblies; a hinge, U-plate, bolt, wing nut, and set screw for positioning the arm assembly at the desired location; and a horizontal bar and diagonal bar for holding an item such as a shelf.

In another aspect of the present invention, holding post assemblies may provide support for articles such as a television. Holding post assemblies may include an upper arm; an arm brace for providing additional support to the holding post assembly; a post slide tube telescopically connected to the upper arm; and a post socket attached to the end of the post slide tube. Attached to the post socket is a post; slotted bars, holding tabs, and springs; which allows the holding post assembly to support an item such as a television.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, an embodiment of the present invention provides a floor to ceiling object support assembly. In accordance with the present invention, a floor to ceiling unit is disclosed that eliminates putting holes in the wall because it is a standalone unit, thus needing no support from the wall. With the floor to ceiling unit described herein, there are no studs that need finding, no holes put in wall, and the unit can be put up in a very short period of time and virtually anywhere indoors (i.e., wherever there is a floor and ceiling). For example, it can be put in the middle of the wall, along the length of the entire wall, or even in the middle of a room. It will be appreciated that the terms "floor" and "ceiling" refer to the lowermost and uppermost surfaces/regions of a space, and do not need to necessarily include a wall. For example, a ceiling of an unfinished garage may include only studs that support a roof.

In accordance with the present invention, a plurality of floor to ceiling units are provided, with each unit supporting a portion of an article/object to be supported, such as a television 88. Each floor to ceiling unit may include a lower leg assembly 40 and an upper leg assembly 48 that are telescopically connected to one another. In use, they extend from a floor 56 to a ceiling 58, and are provided with mounting assemblies 30, which may include plates 32 (for example, 3- to 4-inch plates), nuts 34, threaded rods 36, and coupling nuts 38, for precise height adjustments. Those with skill in the art will appreciate that other mechanisms for providing precise height adjustment may be provided in accordance with the present invention.

In certain embodiments, upper and lower holding arm assemblies 10 provide the direct support for a shelf 54. As shown in the FIGS. 1-5, each holding arm assembly 10 may include: a sleeve including pipe halves 12, 14 for coupling the rest of the holding arm assembly to the leg assemblies 40, 48; a hinge 22, U-plate 20, bolt 26, wing nut 28, and set screw 24 for positioning the arm assembly at the desired location; and horizontal bar 16 and diagonal bar 18 for holding an item, such as the shelf 54. Those with skill in the art will appreciate that the holding arm assemblies 10 may be used to support other similar structure or could be slightly reconfigured to serve other purposes, such as incorporating a hook. This embodiment is described in greater detail below.

Figure 6:
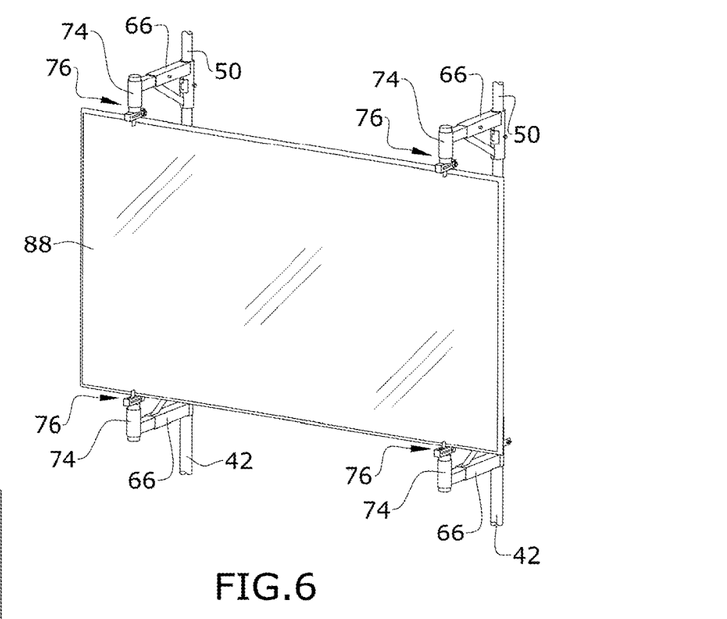
FIG. 6 is a perspective view of an alternate embodiment of the present invention, shown in use.
Figure 7:
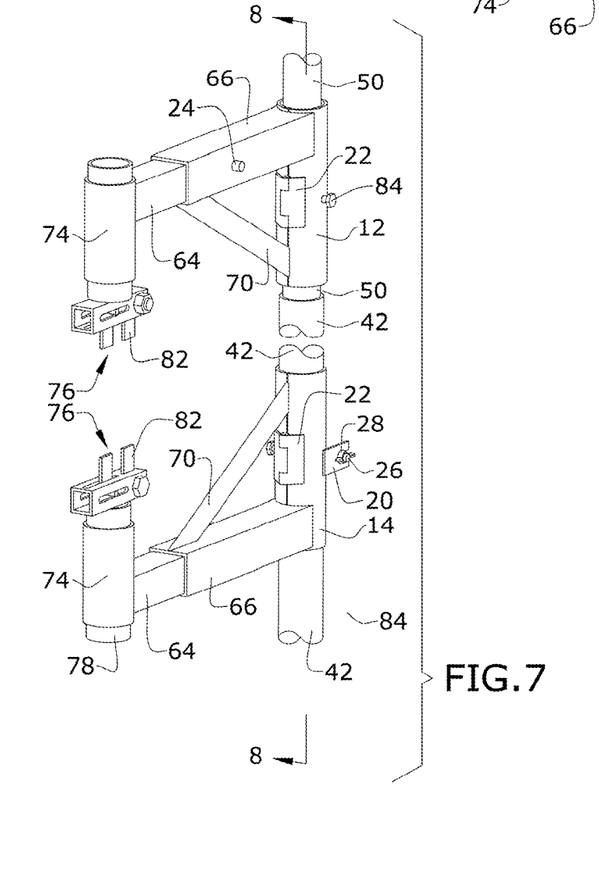
FIG. 7 is a partial perspective view of the alternate embodiment from FIG. 6.
Figure 8:
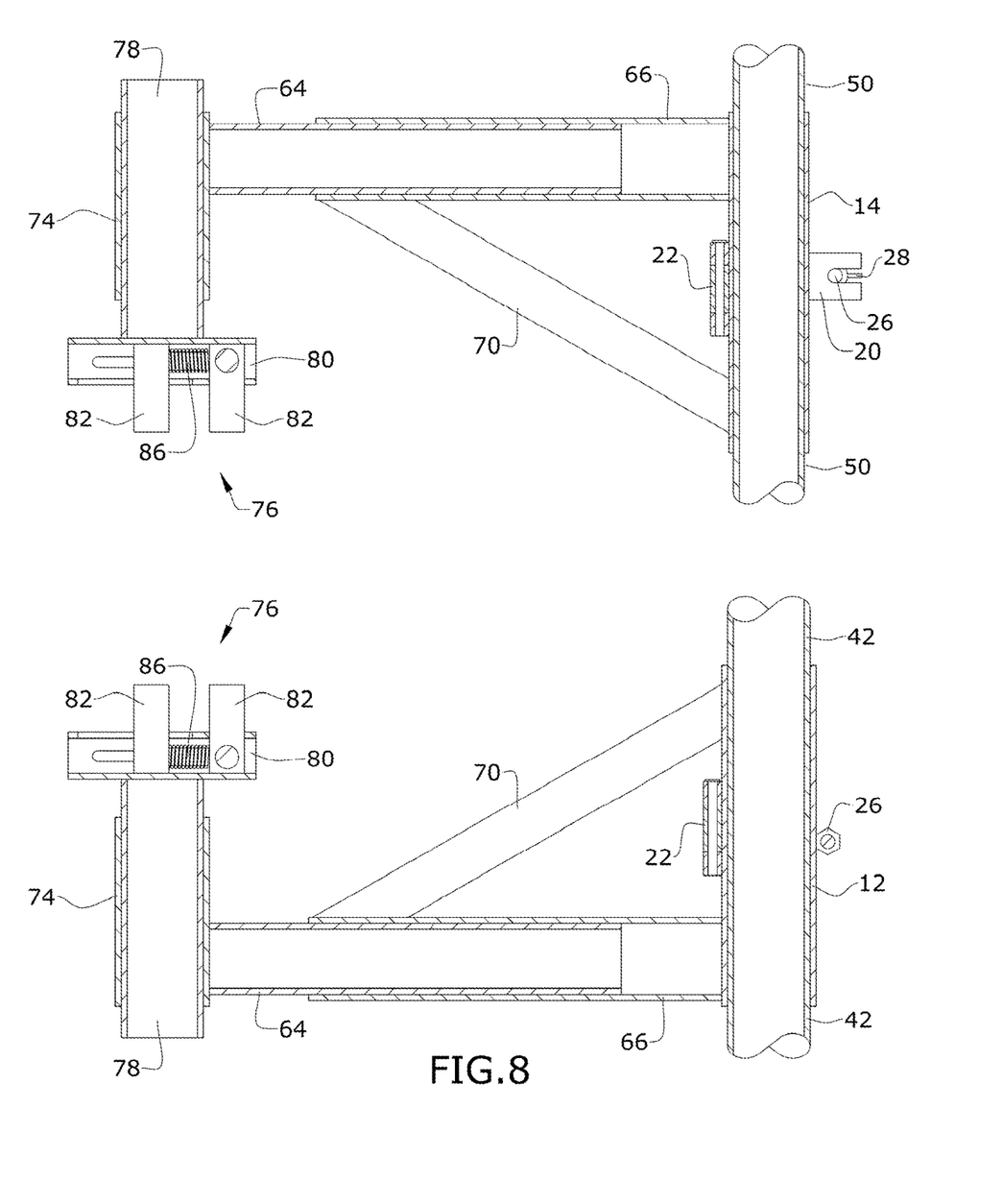
FIG. 8 is a section view taken along line 8-8 from FIG. 7.

In an alternate embodiment, as shown in FIGS. 6-8, holding post assemblies 76 provide support for articles such as a television 88. Holding post assemblies 76 include an upper arm 66; an arm brace 70 for providing additional support to the holding post assembly; a post slide tube 64 telescopically connected to the upper arm 66; and a post socket 74 attached to the end of the post slide tube. Attached to the post socket is a post 78; slotted bars 80, holding tabs 82, and springs 86; which allows the holding post assembly to support an item such as a television 88. This alternate embodiment is described in greater detail below.

Figure 1:
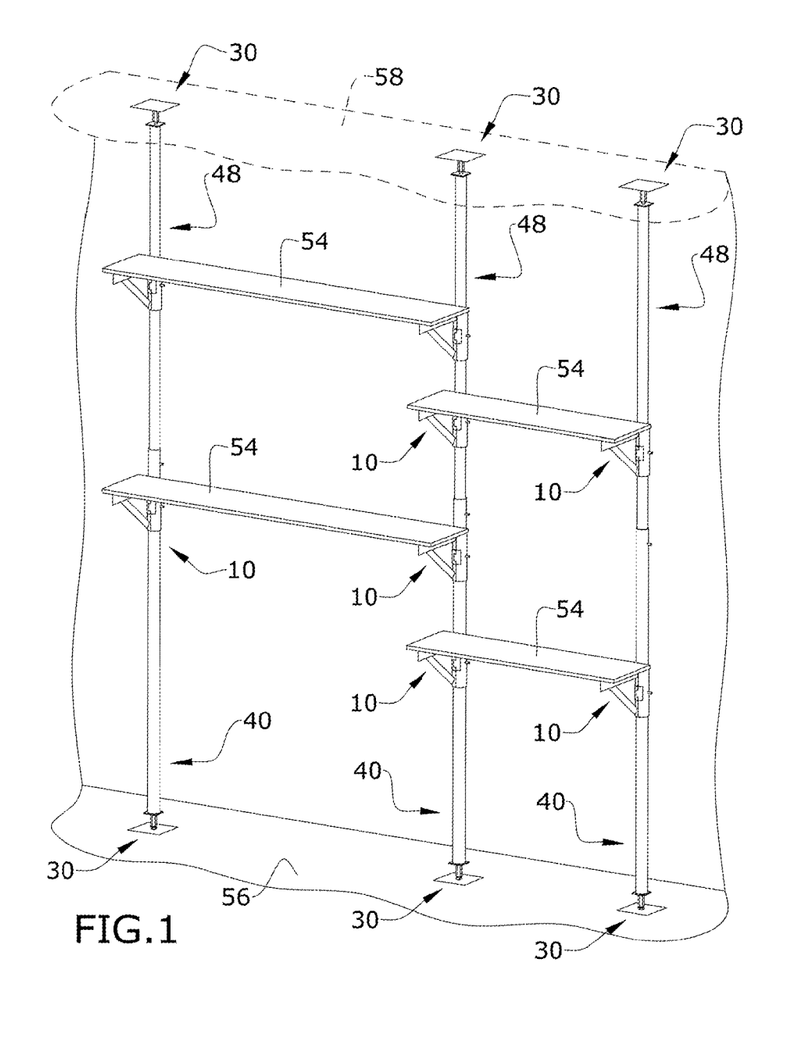
FIG. 1 is a perspective view of an embodiment of the present invention, shown in use.

FIG. 1 illustrates an embodiment of the support assembly, extending from floor 56 to ceiling 58. A shown, a plurality of floor to ceiling units are provided that support various structures. The units include lower leg assemblies 40 and upper leg assemblies 48. Mounting assemblies 30 are located at the ends of the leg assemblies 40, 48 to engage the support assemblies with the floor 56 and ceiling 58, respectively. Shelves 54 are supported by arm assemblies 10 (described in greater detail with respect to claim 3), which may be located at various places on the leg assemblies.

Figure 2:
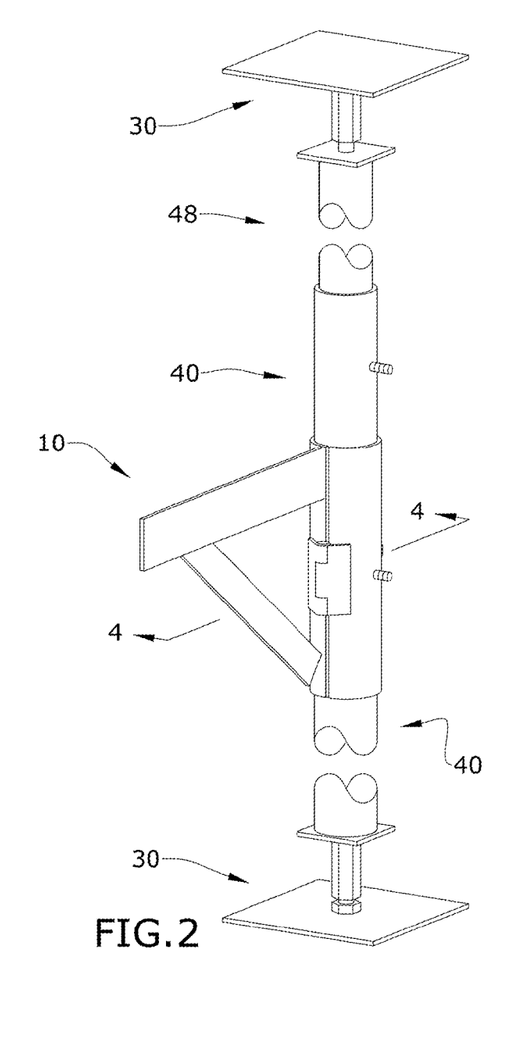
FIG. 2 is a perspective view of the embodiment of the present invention.

FIG. 2 illustrates a floor to ceiling unit of the support assembly, with portions cut away for clarity. Mounting assemblies 30 are located at the ends of the leg assemblies 40 and 48. The upper leg assembly 48 fits inside of lower leg assembly 40, creating a telescoping assembly that can be adjusted to the desired height. Arm assembly 10 fits on the leg assembly 40, 48.

Figure 3:
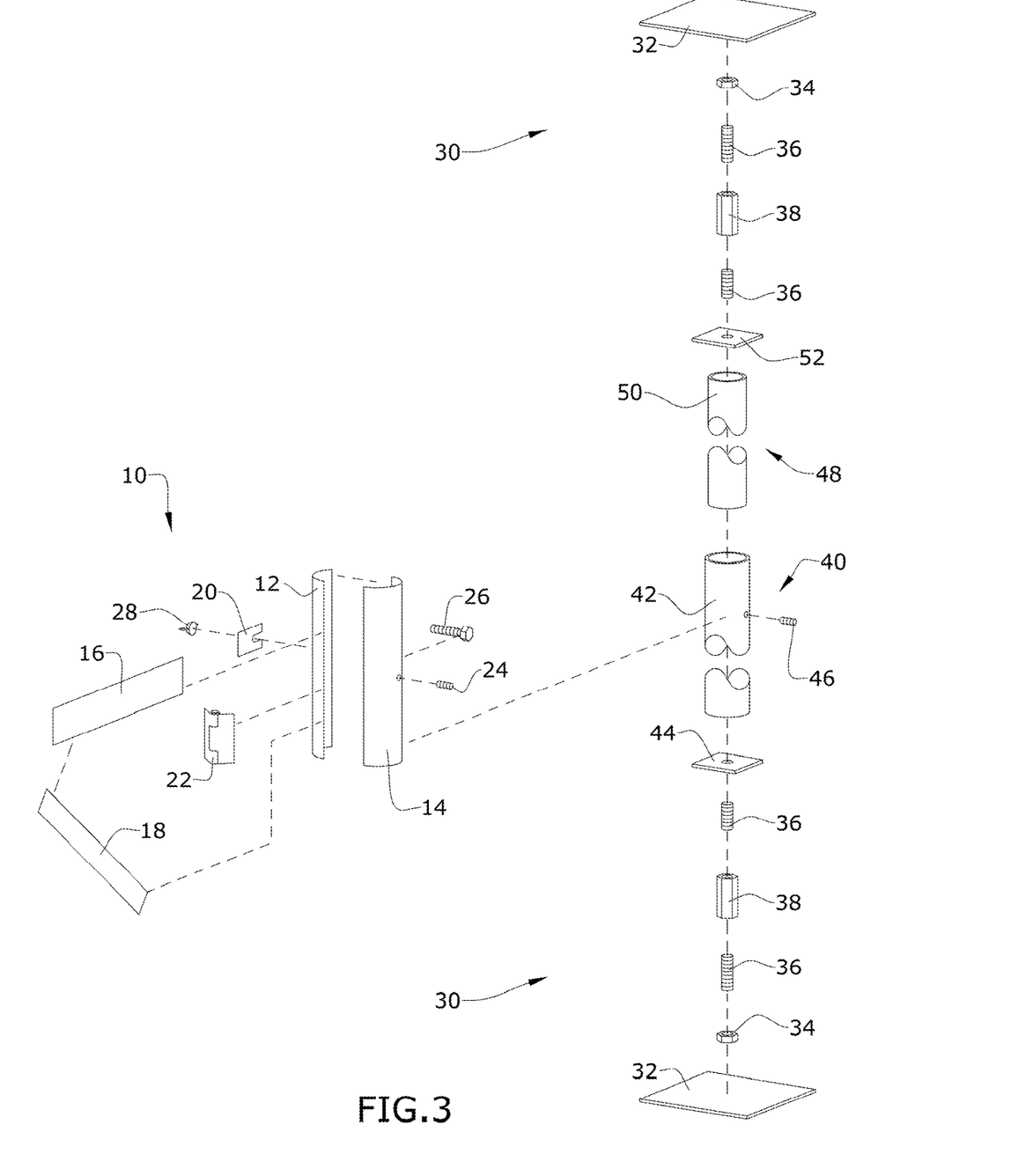
FIG. 3 is an exploded view of the embodiment of the present invention.

FIG. 3 illustrates an exploded view of the arm assembly 10 and mounting assembly 30. The arm assembly includes pipe halves 12 and 14. A hinge 22 is attached to pipe halves 12 and 14, allowing the arm assembly 10 to be moved to the desired location on the leg assembly and clamped thereon. U-plate 20, bolt 26, and wing nut 28 (or another appropriate connection type) hold the pipe halves 12 and 14 together opposite hinge 22 to provide the clamping force. A set screw 24 is provided for additional support and holds the arm assembly 10 to the leg assembly 40, 48. Arm assembly 10 includes horizontal bar 16 and diagonal bar 18.

A mounting assembly includes lower leg assembly 40 and upper leg assembly 48. Lower leg assembly 40 includes tubing 42, and upper leg assembly 4 includes tubing 50. Tubing 42 and 50 connect to each other telescopically, and are held in place by set screw 46. Mounting assembly 30 is connected to the ends of the lower and upper leg assemblies, and includes plate 32, nut 34, threaded rods 36, coupling nut 38, and cap plate 44. A cap plate 52 is sandwiched between the mounting assembly 30 and the respective leg assemblies 40, 48, for providing a connection point for the threaded rod 36 for connection to the leg assemblies.

Figure 4:
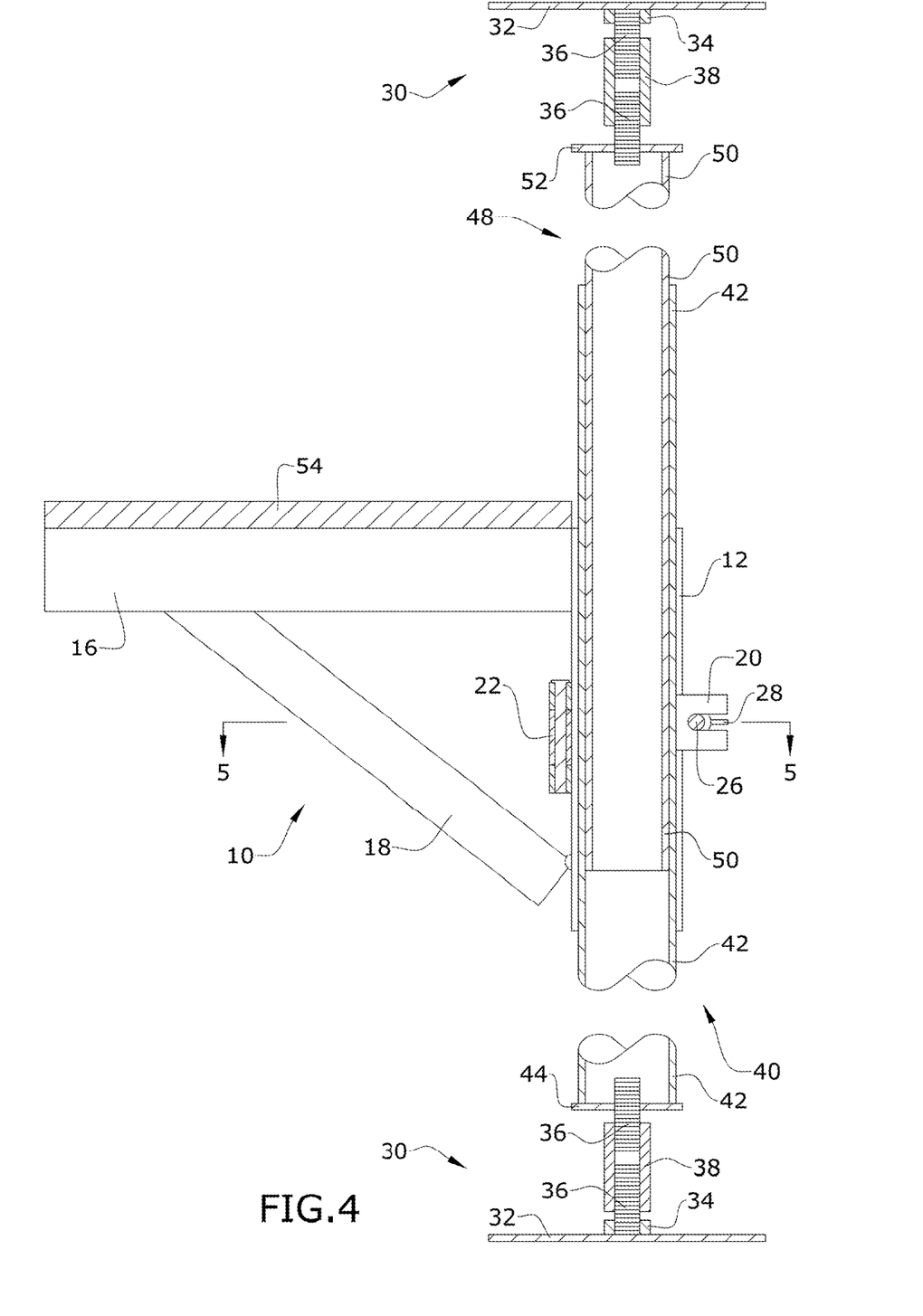
FIG. 4 is a section view taken along line 4-4 from FIG. 2.

FIG. 4 illustrates a cross-sectional view of the support assembly, taken along line 4-4 as shown in FIG. 1. Mounting assemblies 30 include plate 32, nut 34, coupling nut 38, and threaded rods 36 connecting the nut 34 to the coupling nut 38 and the coupling nut to the cap plates 44 and 54. Tubing 42 of lower leg assembly 40 connects to tubing 50 of upper leg assembly 48 telescopically. Hinge 22, U-plate 22, bolt 26, and wing nut 28 hold pipe half 12 (and 14, not shown in FIG. 4) to the leg assemblies. Horizontal bar 16 and diagonal bar 18 are connected to the pipe half 12 (and 14), providing a support for shelves 54.

Figure 5:
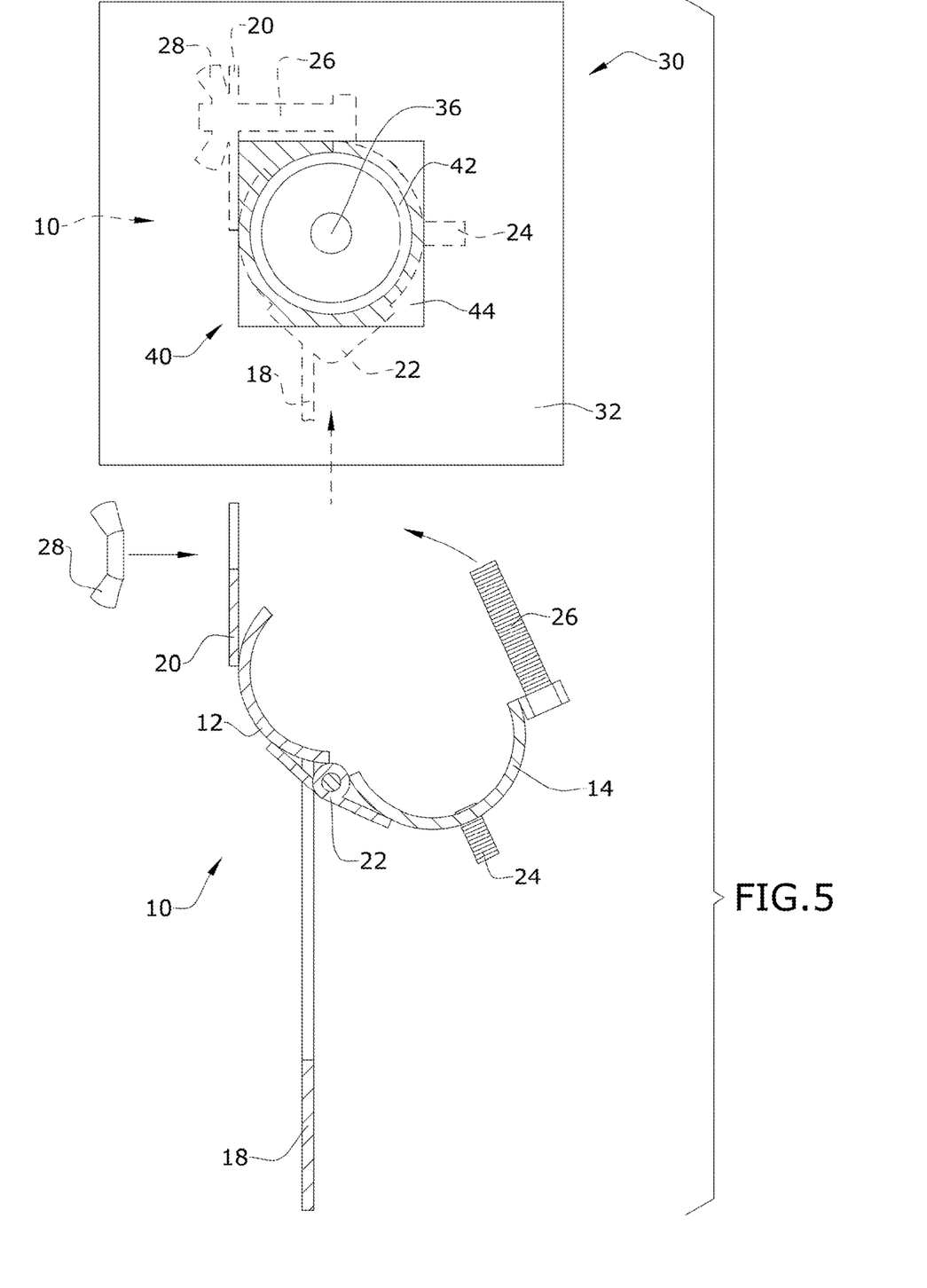
FIG. 5 is a section view taken along line 5-5 from FIG. 4.

FIG. 5 illustrates a cross-sectional view of the support assembly, showing mounting assembly 30 and arm assembly 10, taken along line 5-5 as shown in FIG. 4. In the arm assembly 10, hinge 22 is attached to pipe halves 12 and 14. The pipe halves are held together by U-plate 20, bolt 26, and wing nut 28. Set screw 24 holds the support assembly to the leg assemblies.

FIG. 6 illustrates a perspective view of an alternate embodiment of the support assembly. It will be appreciated that certain portions of this embodiment that are the same as the previously described embodiment (such as the leg assemblies and the mounting assemblies) are not illustrated in full, in order to focus on details relevant to this embodiment. In this embodiment, the support assembly is configured to support a TV 88. Holding arm assemblies 76 (functioning in a similar manner as the arm assemblies 10, and also referred to herein as holding post assemblies) are attached to tubing 42 and 50 of the leg assemblies. Holding post assemblies 76 include upper arm 66 and post socket 74. The holding post assemblies support an object such as a TV 88.

FIG. 7 illustrates a partial perspective view of the embodiment of FIG. 6. Holding post assemblies 76 are attached to tubing 42 and 50 of the leg assemblies via pipe halves 12 and 14, hinge 22, U-plate 20, bolt 26, and wing nut 28. This provides a similar functionality as that of the embodiment of FIGS. 1-5 (e.g., the height adjustability). Holding post assemblies 76 are held to the tubing by bolts 84. Holding post assemblies include upper arms 66 and post slide tubes 64, which are connected telescopically and held in place by set screws 24. Arm braces 70 support the holding post assemblies. Connected to the distal end of post slide tubes 64 are post sockets 74. Posts 78 fit inside of post sockets 74. Holding tabs 82 are connected to the posts 78 for holding the desired object, such as a TV. At least one of the holding tabs 82 on each holding post assembly 76 can slide towards and away from the other holding tab 82 (slots in FIGS. 7 and 8 can be seen that support this functionality).

FIG. 8 illustrates a cross-sectional view of the alternate embodiment of FIGS. 6-7, taken along line 8-8 as shown in FIG. 7. Holding post assemblies 76 are shown attached to tubing 48 and 50. Slotted bars 80 are connected to the end of posts 78. Slotted bars 80 support the holding tabs 82 and springs 86. The springs 86 bias the tabs 82 towards one another to securely retain the object being supported (like the TV 88).

In general, because of the couplings of the various parts (such as the slotted couplings), many different support arrangements are allowed, as the holding arm assemblies can be varied in height as well as angular disposition. As is readily apparent from the foregoing, the present invention can be configured for various purposes, such as supporting a television/panel, functioning as shelving (e.g., corner shelving), or supporting a curtain the serves as a room divider.

While methods of making the present invention would be readily apparent from the foregoing as well as the figures, to make an embodiment of the present invention, two poles are fitted tight inside the other with holes to adjust the overall pole height with adjustable screws on each end, the adjustable screws being connected to a plate. Holding arm assemblies are also assembled in a manner as described above and shown in the figures which support the, for example, television, in use. To use, a user simply extends the units from floor to ceiling and adjusts the adjustable feet to a tight fit. The holding arm assemblies are then secured in the desired position and angle, and the television or shelves may be put in place, thus being supporting by the holding arm assemblies without the need for mounting directly to a wall.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. Also, the terms in the claims have their plain, ordinary meaning unless otherwise explicitly and clearly defined by the patentee. Terms, such as "bolt", "screw", and "nut" may be generalized to terms such as "fasteners" and "connectors", as those with skill in the art will appreciate that there are many ways to achieve similar functionality with slightly modified connection arrangements. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A floor-to-ceiling support assembly; comprising:
a lower leg assembly;
an upper leg assembly telescopically connected to the lower leg assembly;
a lower mounting assembly coupled to a distal end of the lower leg assembly, the lower mounting assembly comprising a lower plate that is adjustable towards and away from the lower leg assembly, the lower plate being configured to engage a floor;
an upper mounting assembly coupled to a distal end of the lower leg assembly, the upper mounting assembly comprising an upper plate that is adjustable towards and away from the upper leg assembly, the upper plate being configured to engage a ceiling;
at least one arm assembly coupled to the lower leg assembly or the upper leg assembly and configured to support an object;
wherein the at least one arm assembly is displaceable longitudinally along the lower leg assembly or the upper leg assembly;
further comprising at least one fastener for holding the at least one arm assembly to the lower leg assembly or upper leg assembly;
wherein the at least one arm assembly comprises:
two pipe halves;
a hinge connecting the pipe halves; and
a coupling mechanism connecting the pipe halves opposite the hinge to clamp the at least one arm assembly to the lower leg assembly or the upper leg assembly; and
wherein the at least one arm assembly further comprises an upper arm connected to one of the pipe halves; a post slide tube connected telescopically to the upper arm; and a post socket connected to the distal end of the post slide tube.

2. The support assembly of claim 1, wherein the at least one arm assembly further comprises a horizontal bar connected to one of the pipe halves; and a diagonal bar connected to the one of the pipe halves and to the horizontal bar.

3. The support assembly of claim 1, further comprising a post attached to the post socket.

4. The support assembly of claim 3, further comprising a slotted bar attached to an end of the post.

5. The support assembly of claim 4, further comprising at least one holding tab attached to the slotted bar, wherein the at least one holding tab is configured to hold the object.

6. The support assembly of claim 1, wherein the object is a shelf or a television supported by the at least one arm assembly.

* * * * *